United States Patent

Zychowicz

[11] Patent Number: 5,166,832
[45] Date of Patent: Nov. 24, 1992

[54] EXTERIOR VIEW MIRROR FOR A MOTOR VEHICLE

[75] Inventor: Richard Zychowicz, Dammarie les Lys, France

[73] Assignee: Britax (GECO) S.A.

[21] Appl. No.: 543,456

[22] Filed: Jun. 26, 1990

[30] Foreign Application Priority Data

Jun. 27, 1989 [GB] United Kingdom ............... 8914707

[51] Int. Cl.⁵ .......................... G02B 7/18; B60R 1/06
[52] U.S. Cl. .................................... 359/841; 359/843; 359/877; 248/479; 248/487
[58] Field of Search ............... 350/604, 637; 359/841, 359/843, 873, 877; 74/501 M; 248/479, 487

[56] References Cited

U.S. PATENT DOCUMENTS

| | | | |
|---|---|---|---|
| 4,626,085 | 12/1986 | Suzuki | 350/604 |
| 4,657,362 | 4/1987 | Suzuki | 359/841 |
| 4,692,000 | 9/1987 | Wada et al. | 350/604 |
| 4,786,157 | 11/1988 | Mori et al. | |

FOREIGN PATENT DOCUMENTS

| | | |
|---|---|---|
| 0173433 | 2/1985 | European Pat. Off. |
| 0305590 | 6/1985 | European Pat. Off. |
| 0148738 | 8/1985 | Japan ............... 350/637 |
| 0173745 | 7/1988 | Japan ............... 350/637 |
| 1137264 A | 1/1985 | U.S.S.R. |

Primary Examiner—Bruce Y. Arnold
Assistant Examiner—R. D. Shafer
Attorney, Agent, or Firm—Davis, Bujold & Streck

[57] ABSTRACT

An exterior view mirror for a motor vehicle has a mirror housing secured to a cylindrical boss which is pivotally mounted on a base. A clutch, which secures the housing at a predetermined orientation relative to the base, comprises a first member carrying a detent formation, a second member journalled on the first member so as to be axially movable relative thereto to bring the detent formation into engagement with a complementary formation on the second member, and a spring for causing relative axial movement between the first member and the second member to bring the detent formation into engagement with the complementary formation. The clutch can be released by heating a shape memory alloy wire which is arranged to oppose the spring so as to cause disengagement of the detent formation from the complementary formation.

5 Claims, 2 Drawing Sheets

EXTERIOR VIEW MIRROR FOR A MOTOR VEHICLE

BACKGROUND OF THE INVENTION

This invention relates to an exterior view mirror for a motor vehicle of the type which is adapted to be mounted on the side of the vehicle and to be foldable to a position closely adjacent to the side of the vehicle to facilitate passage of the vehicle through narrow passageways and parking of the vehicle in confined spaces. Patent Specification SU-A-1137264 discloses a clutch having a component formed from shape memory alloy and arranged so that when the component is heated by an electrical heater, the driving and driven elements of the clutch disengage from one another. It is also known from Patent Specification EP-A-0173433 that the electrical resisitivity of shape memory alloys of nickel and titanium is such that an element formed therefrom can conveniently be transformed from its relaxed phase to its force-exerting phase by passing an electric current through it.

BRIEF SUMMARY OF THE INVENTION

According to the invention, in one aspect, a rear iew mirror for a motor vehicle comprises a base adapted to be mounted on the side of a motor vehicle; a housing pivotally mounted on the base for angular movement between a position in which it projects laterally from the side of the vehicle and a position in which it is located in close proximity to the side of the vehicle, a clutch for securing the housing at a pre-determined orientation relative to the base and remotely operable release means for causing disengagement of the clutch.

Preferably, the mirror includes means for causing displacement of the housing away from said predetermined orientation when the clutch is disengaged. The mirror may further include remotely operable means for returning the housing to said predetermined orientation. The remotely operable return means may comprise a shape memory alloy wire arranged, when heated, to pull the housing into said predetermined orientation. The release means may also include a shape memory alloy wire adapted, when heated, to cause disengagement of the clutch.

According to the invention in another aspect, a clutch comprises a first member carrying a detent formation, a second member journalled on the first member so as to be axially movable relative thereto to bring the detent formation into engagement with a complementary formation on the second member, a spring for causing relative axial movement between the first member and the second member to bring the detent formation into engagement with the complementary formation and a shape memory alloy wire arranged when heated to oppose the spring to cause disengagement of the detent formation from the complimentary formation.

BRIEF DESCRIPTION OF THE DRAWINGS

FIG. 5 is a scrap sectional view of part of the mirror assembly shown in FIG. 1.

DETAILED DESCRIPTION

Figure 1:
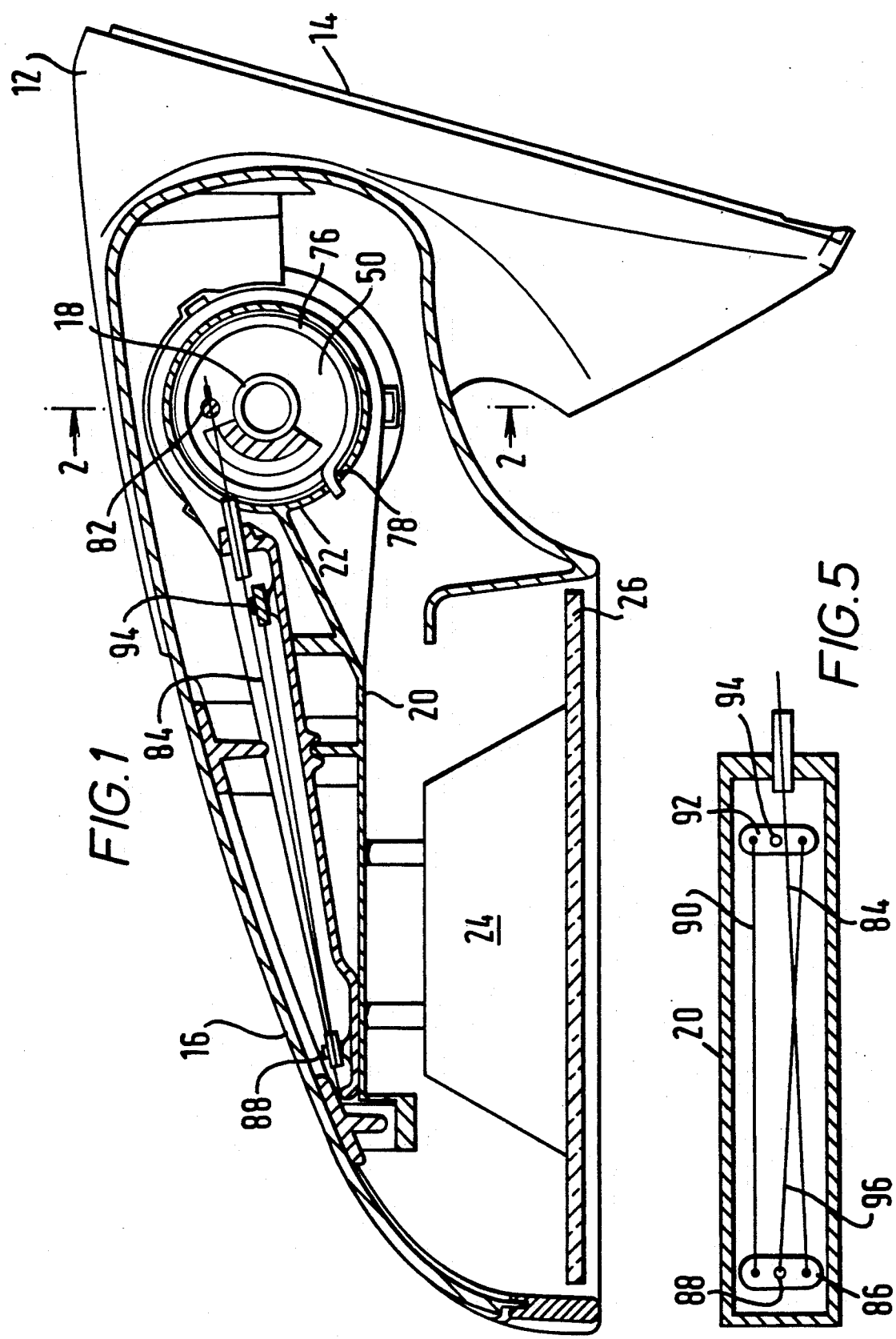
FIG. 1 is a horizontal view of a rear view mirror for a motor vehicle accordance with the invention.

FIG. 1 shows a mirror assembly comprising a base member 12 having a face 14 adapted to abut against the side of a vehicle body. A housing 16 is pivotally mounted on base member 12 for angular movement about a vertical axle 18. The housing 16 is fixed to an internal frame member 20 which has a hollow cylindrical boss 22 at one end embracing the axle 18 and which carries means 24 (not shown in detail) supporting a reflective member 26 so as to permit adjustment of the orientation of the latter relative to the housing 16.

Figure 2:
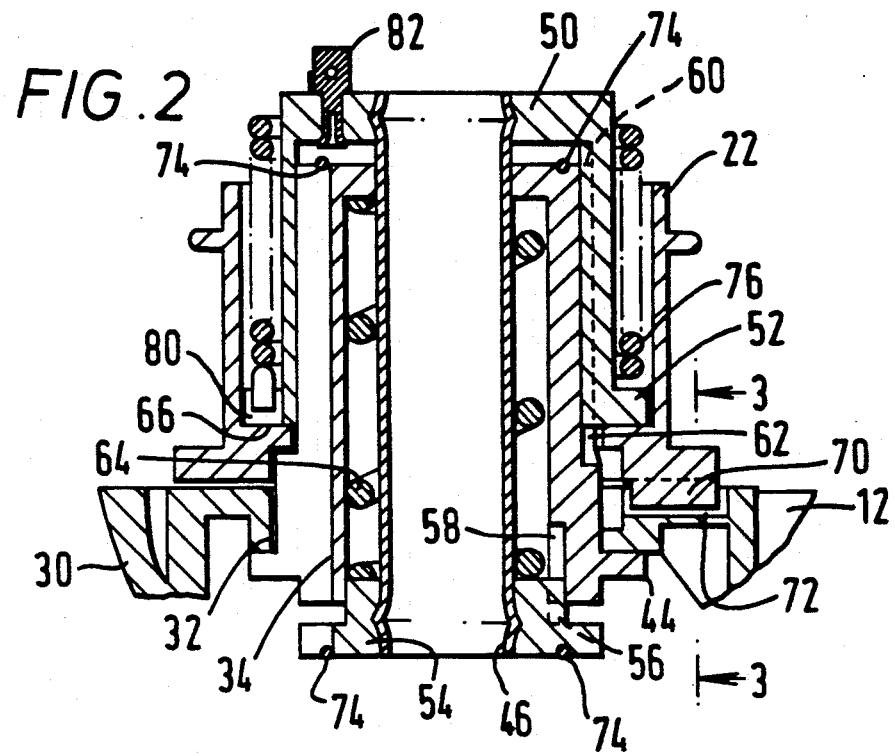
FIG. 2 is a sectional view taken on the line 2—2 in FIG. 1.
Figure 3:
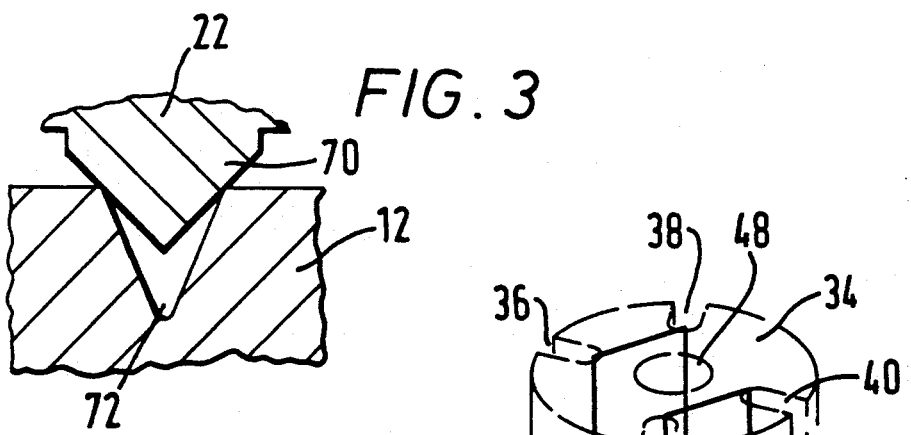
FIG. 3 is a scrap sectional view taken on the line 3—3 in FIG. 2.
Figure 4:
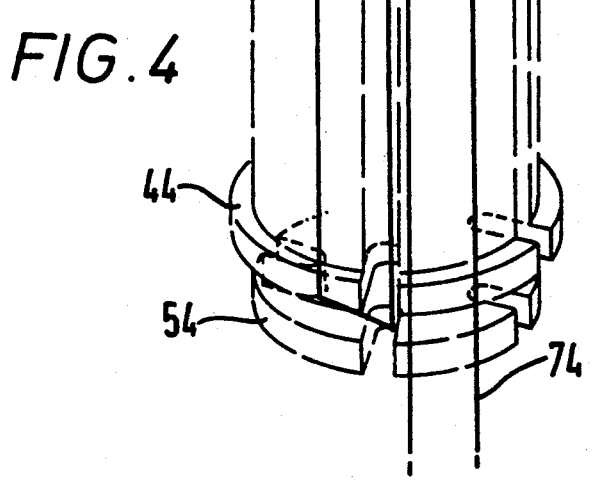
FIG. 4 is a schematic perspective view of some of the components shown in FIG. 2.

Referring to FIG. 2, the base member 12 has an outwardly projecting portion 30 containing a vertical hole 32. A hollow cylindrical member 34 is journalled in the hole 32. FIG. 4 shows the cylindrical member 34 uniformly spaced grooves 36, 38, 40 and 42 in the cylindrical face extending parallel to the cylinder axis. On its lower end, the cylindrical member 34 has a flange 44 which is secured to the surface surrounding the hole 32 on lower side of the base member 12.

A tubular member 46 extends through a central hole 48 in the top of the cylindrical member 34 and is fast with an upper end cap 50 having a downwardly extending cylindrical flange 52. The lower end of the tubular member 46 is secured to a lower end cap 54. The lower end cap 54 has a keyway 56 which is engaged by a spline 58 on the inner surface of the cylindrical member 34. Similarly, the cylindrical flange 52 of the upper end member has a keyway 60 engaged by a spline 62 on the outer surface of the cylindrical member 34. The result is that the assembly comprising the tubular member 46 and its end caps 50 and 54 is capable of limited axial movement relative to the cylindrical member 34 but is constrained against relative angular movement about their common axis. A compression spring 64 engages with the lower end cap 54 so as to bias it downwardly relative to the tubular member 34. The bottom edge of the flange 52 on the upper end cap 50 engages with a flange 66 on the inside of the boss 22 with the result that the compression spring 64 has the effect of urging the bottom surface of the boss 22 into engagement with the top surface of the base 12. A V-shaped detent formation 70 on the bottom surface of the boss 22 engages in a V-shaped groove 72 in the top surface of the base 12 when the mirror housing 16 is at its orientation of normal use relative to the base member 12. Displacement of the housing 16 from this orientation is, therefore, resisted by the compression spring 64.

As can be seen from FIG. 4, a shape memory alloy wire 74 passes through an opening in the bottom end cap 54, up the groove 38 in the cylindrical member 34, across the top thereof, down the groove 36, across the bottom of the bottom end cap 54, up the groove 42, across the top of the cylindrical member 34 and finally down through the groove 40 and the end cap 54. The two ends of the wire 74 are fixed to the end cap 54 where they pass through it. The length of the shape memory alloy wire 74 is adjusted so that, if it is heated above its transition temperature, e.g., by passage of an electric current, it contracts, drawing the end cap 54 upwardly towards the cylindrical member 34 against the action of the compression spring 64. This reduces the force resisting displacement of the V-shaped detent formation 70 out of the groove 72 to that exerted by the weight of the housing 16. A torsion spring 76 engages between a hole 78 in the boss 22 and a slot 80 in the flange 52 on the end cap 50 so as to cause displacement of the housing 16 to a position in which the reflective member 26 is in substantial alignment with the face 14 on the base member 12.

The clutch comprises a first and a second member. The first member comprises the lower and upper end caps 54 and 50, respectively, the tubular member 46 extending therebetween and fast with both of the two end caps 54 and 50, the cylindrical flange 52 extending downwardly from the upper end cap 50, and the boss 22 carrying the V-shaped detent formation 70. The second member comprises the base member 12, carrying the V-shaped groove 72, and the cylindrical member 34 which is secured to a bottom surface of the base member 12 via the flange 44.

As can be seen in FIGS. 1 and 2, the upper end cap 50 has a projection 82. Referring particularly to FIGS. 1 and 5, a second shape memory alloy wire 84 has one end attached to the projection 82 and the other to a link 86 which is pivotally mounted on a pin 88 projecting from the frame member 20. A third shape memory alloy wire 90 extends from the other end of the link 86 to a second link 92 which is pivotally mounted on a pin 94 also secured to the frame member 20. A fourth shape memory alloy wire 96 extends from the other end of the link 92 to the first pivot pin 88. The length of the wires 84, 90 and 96 are arranged to be such that, when heated above their transition temperature, e.g., by passing an electric current through them, they pull the housing 16 into a position in which the detent 70 can engage in the groove 72 against the action of the torsion spring 76.

In normal use, the V-shaped detent 70 engages in the groove 72, holding the housing 16 in its orientation of normal use relative to the base member 12. If it is desired to fold the housing 16 into close proximity of the vehicle, an electric current is connected to heat the first shape memory alloy wire 74, causing it to contract, thereby compressing the spring 64. The force exerted by the torsion spring 76 is sufficient to lift the detent 70 out of the groove 72 and then displace the housing 16 in the counter-clockwise direction as viewed in FIG. 1.

To restore the housing 16 to its position of normal use, the other shape memory alloy wires 84, 90 and 96 are heated by passing an electric current through them. This draws the housing back to its position of normal use (illustrated in FIG. 1) against the action of the torsion spring 76. In order to reduce friction caused by the compression spring 64, it is desirable also to heat the first shape memory alloy wire 74 while the housing is returned to its position of normal use.

The second, third and fourth shape memory alloy wires 84, 90 and 96 may be replaced by a single shape memory alloy wire, the distance of the projection 82 from the pivot axis being reduced by one third. This has the advantage of simplifying the mechanism. However, such single shape memory alloy wire must be capable of exerting three times the force exerted by the wires 84, 90 and 96 and consequently it must be made thicker.

The use of straight shape memory alloy wires (rather than coiled springs) has the advantage that the heat treatment of such wire during manufacture may be done as a continuous process, with wired wound round large-diameter rollers, rather than each spring having to be subject to individual heat treatment under stress.

I claim:

1. An exterior view mirror for a motor vehicle comprising:
   a base for securing said exterior mirror to a motor vehicle body,
   a housing pivotally mounted on the base for angular movement between a position in which it projects laterally from the side of the vehicle and a position in which it is located in close proximity to the side of the vehicle,
   a clutch for securing the housing at a predetermined orientation relative to the base, the clutch comprising a first member carrying a detent formation, a second member journalled on the first member so as to be axially movable relative thereto to bring the detent formation into engagement with a complementary formation on the second member, and a spring for causing relative axial movement between the first member and the second member to bring the detent formation into engagement with the complementary formation, and
   a shape memory alloy wire extends around at least three anchorage locations on said first member and said second member, and arranged so that at least two lengths of the wire operate when heated to oppose the spring to cause disengagement of the detent formation from the complementary formation.

2. An exterior view mirror according to claim 1, further comprising means for causing displacement of the housing away from said predetermined orientation when the clutch is disengaged.

3. An exterior view mirror according to claim 2, wherein the means for causing displacement of the housing away from said predetermined orientation comprise a torsion spring.

4. An exterior view mirror according to claim 1, further comprising remotely operable means for returning the housing to said predetermined orientation.

5. An exterior view mirror according to claim 4, wherein the remotely operable return means comprises at least one additional shape memory alloy wire arranged, when heated, to pull the housing into said predetermined orientation.

* * * * *